US006209070B1

United States Patent
Reed et al.

(10) Patent No.: US 6,209,070 B1
(45) Date of Patent: Mar. 27, 2001

(54) SYSTEM FOR MULTIPLE DATA TRANSFER OPERATIONS

(75) Inventors: David Charles Reed; John Glenn Thompson, both of Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/045,138

(22) Filed: Mar. 20, 1998

(51) Int. Cl.[7] .................................................. G06F 12/00
(52) U.S. Cl. ............................ 711/165; 711/154; 710/33
(58) Field of Search .................................... 711/202, 206, 711/165, 154; 710/33

(56) References Cited

U.S. PATENT DOCUMENTS

| 5,403,639 | 4/1995 | Belsan et al. ......................... 707/204 |
| 5,410,667 | 4/1995 | Belsan et al. ......................... 711/114 |
| 5,450,384 | 9/1995 | Dahman et al. ....................... 369/30 |
| 5,526,328 | 6/1996 | Oshima et al. ........................ 369/13 |
| 5,566,314 | * 10/1996 | DeMarco et al. .................... 711/103 |
| 5,568,628 | 10/1996 | Satoh et al. .......................... 711/113 |
| 5,590,272 | 12/1996 | Murata et al. .......................... 714/2 |
| 5,682,360 | 10/1997 | Oshima ................................. 369/13 |
| 5,918,243 | * 6/1999 | Giordano et al. .................... 711/112 |
| 5,948,080 | * 9/1999 | Baker ..................................... 710/37 |

FOREIGN PATENT DOCUMENTS

| 0784260 | 1/1997 | (EP) . |
| 3268019 | 3/1990 | (JP) . |
| 3280143 | 3/1990 | (JP) . |

OTHER PUBLICATIONS

IBM Corporation, IBM Technical Disclosure Bulletin—Performance Enhancements During Establish Duplex Pair, vol. 37, No. 10, Oct. 1994.
Evans, Chris (IBM Corporation), The tip of the iceberg: RAMAC Virtual Array—Parts I and II, Mar./Apr. 1997.
IBM Corporation, IBM RAMAC Virtual Array, Jul. 1997, IBM Doc. No. SG24-4951-00 (selected portions only).

* cited by examiner

Primary Examiner—John W. Cabeca
Assistant Examiner—Matthew D. Anderson
(74) Attorney, Agent, or Firm—David W. Victor; Konrad Raynes & Victor LLP (57) ABSTRACT

Disclosed is a system for transferring data involving a data movement, such as the duplication of address information, that includes two data movement components. A first data transfer from at least one source storage location to at least one target storage location is processed. A data structure indicates the source storage locations from which data was transferred during processing of the first data transfer. A second data transfer from a plurality of source storage locations to a plurality of target storage locations is processed. The data structure is then processed to determine the source storage locations included in the second data transfer that were not involved in the first data transfer. Data is then transferred from the source storage locations that were not involved in the first data transfer to the target storage locations that did not receive data during the processing of the first data transfer.

37 Claims, 5 Drawing Sheets

FIG. 4a    INITIAL SOURCE EXTENT LIST    INITIAL TARGET EXTENT LIST 1-5    6-10

FIG. 4c

FIG. 4b    MODIFIED SOURCE EXTENT LIST    MODIFIED TARGET EXTENT LIST 1
3-5

SYSTEM FOR MULTIPLE DATA TRANSFER OPERATIONS

BACKGROUND OF THE INVENTION

1. Field of the Invention

The present invention relates to a system for transferring data and, in particular, a data transfer system that is comprised of two separate data movement operations.

2. Description of the Related Art

In a virtual memory architecture, a functional virtual volume, track or other data set points to an actual physical data storage space in a group of direct access storage devices (DASDs), such as a group of hard disk drives. The DASDs are partitioned into groups called arrays. The data to which a functional volume points can be positioned anywhere in any of the physical storage arrays. Virtual architecture systems are implemented in International Business Machine Corporation's (IBM) RAMAC™ Virtual Array systems ("RAMAC") and Storage Technology Corporation's StorageTek Iceberg™ 9200 subsystem. IBM is the assignee of the subject patent application.

In these virtual architecture systems, the host system views functional volumes that a storage subsystem typically maps to an array of physical DASD devices managed by the subsystem. In the IBM RAMAC system, the host system generates and maintains a Functional Device Table (FDT) that includes information on all functional volumes defined in the system. Each functional volume is comprised of a number of functional tracks. A Functional Track Directory (FTD) is a table that maps each functional track within a functional volume to a physical location in the DASD.

The IBM RAMAC and Storage Technology Corporation's StorageTek Iceberg™ 9200 subsystem include a software feature referred to as SnapShot™. SnapShot involves a virtual duplication function that copies the address information describing the physical storage locations a functional data set or volume addresses to another functional volume or data set without moving the actual data. Thus, after a SnapShot, there are two sets, e.g., a source volume and target volume, of addresses to the same physical locations. The host system views the source and target volumes, i.e., the two sets of pointers, as two separate entities. The time taken to make the SnapShot copy is minimal compared to actually moving the data as only address information is copied, not the actual data. SnapShot dramatically reduces time, CPU costs, channel utilization, and storage space expenses normally required for data duplication.

In a virtual disk architecture, such as RAMAC, updates to the source and target volumes are made to new DASD locations. An update to a functional track is made by writing data to a new physical location and updating the functional track to address this new physical location. Thus, an update to one of the copies of the addresses does not effect the addressing of the other copy. However, after the update, the functional track addresses the DASD location storing the updated data and does not address the DASD location storing the old data. For instance, after a SnapShot, the functional tracks within two separate functional volumes A and B address the same physical locations on the DASD. An update to a functional track in either functional volume does not affect the addressing in the other volume.

Figure 1A:
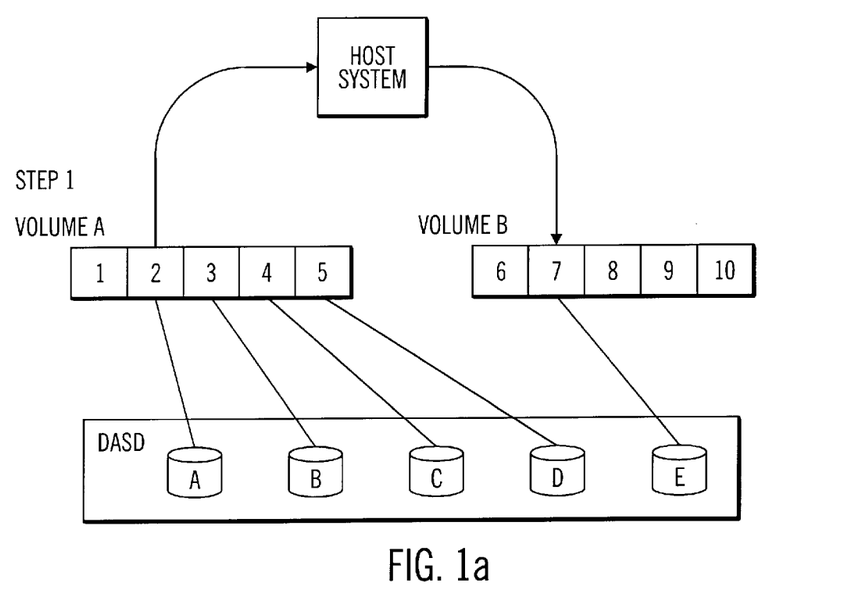
FIGS. 1A and 1B illustrate data movement operations known in the art.
Figure 1B:
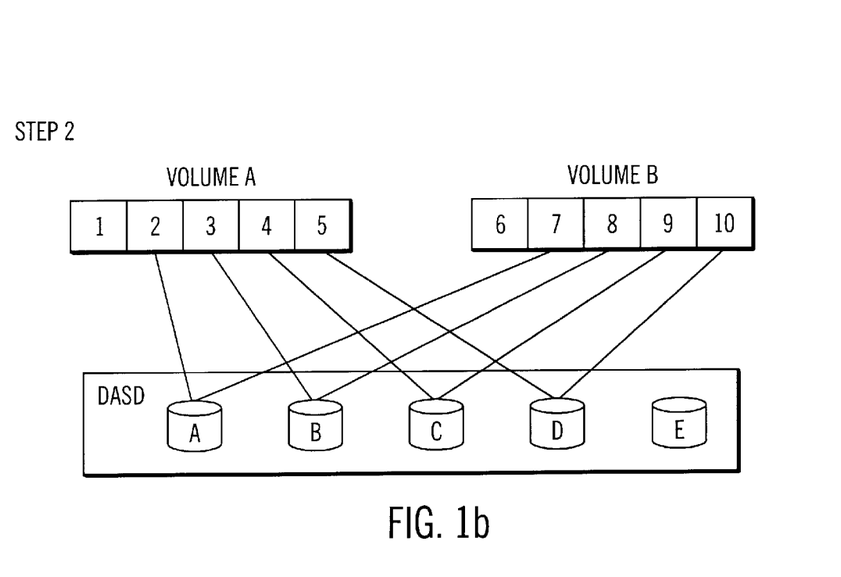

In performing address duplication, such as SnapShot, it is often necessary to perform at least two separate data movement operations. For instance, the first data movement may involve moving data from a source volume, modifying such data, and then transferring the data to a target volume. The second data movement operation may then involve copying all the address pointers from the source to target volume. A problem may arise in such dual data movement operations because the address duplication operation is not aware of the first data movement operation. FIGS. 1A and B illustrate this problem in a SnapShot copy of address information from source tracks 1–5 to target tracks 6–10. At step 1 of the SnapShot address duplication procedure, shown in FIG. 1A, functional track 2 of volume A addresses physical location A in the DASD. In the first data movement operation, the host system moves the data in cylinder A to cylinder E. Cylinder E is addressed by functional track 7 in Volume B. In certain instances, the host system may modify or alter the data transferred from physical location A in the DASD before copying it to physical location E.

At step 2, shown in FIG. 1B, the address pointers of volume A are copied to volume B. As can be seen from the result of Step 2, in volume B, functional track 7 no longer addresses physical location E. Thus, the data movement from the first operation was negated by the second data movement operation which rearranged the addressing of volume B to that of volume A. This problem may arise in any address duplication method which involves a first data movement followed by a duplication of the address information.

The problem illustrated in FIGS. 1A and B may occur during a SnapShot copy operation when the Volume Table of Contents (VTOC) is copied during an initial data movement operation from the source to the target. The VTOC is a data set that resides on a DASD volume and describes the contents of that volume. The VTOC is comprised of data set control blocks (DSCBs) that describe the type and/or location of data sets on that volume of contiguous areas of unassigned space. The VTOC may reside at different locations on a DASD volume. Each volume has a unique VTOC. When performing a SnapShot of a volume, the host system first copies the VTOC data for volume A, modifies the copied VTOC to reflect the structure of volume B, and then transfers the modified volume B VTOC to a new physical location in the DASD. The target functional track addressing the target VTOC may be different than the source functional track addressing the physical location storing the source VTOC. During the subsequent address duplication procedure, the functional tracks of the target will be changed to address the same physical locations as the source functional tracks. The second data movement operation modifies the target addressing so that the target functional track previously addressing the target VTOC location will no longer address the location of the target VTOC.

SUMMARY OF THE INVENTION

To overcome the limitations in the prior art described above, the present invention discloses a system for transferring data. A first data transfer from at least one source storage location to at least one target storage location is processed. A data structure indicates the source storage locations from which data was transferred during processing of the first data transfer. A second data transfer from a plurality of source storage locations to a plurality of target storage locations is processed. The data structure is then processed to determine the source storage locations included in the second data transfer that were not involved in the first data transfer. Data is then transferred from the source storage locations that were not involved in the first data transfer to the target storage locations that did not receive data during the processing of the first data transfer.

In further embodiments, the source and target storage locations are addresses that address physical storage locations.

In yet further embodiments, the first data transfer comprises the transfer of data from the physical storage locations addressed by the source storage locations to the physical storage locations addressed by the target storage locations included in the first data transfer.

Still further, the second data transfer may comprise the transfer of address information from the source storage locations to the target storage locations, wherein after the transferring of address information in the second data transfer, the target storage locations address the same physical storage locations that the source storage locations involved in the second data transfer address.

The preferred embodiments of the present invention allow for a second data transfer operation, following a first data transfer operation, that does not effect or overwrite the transfer of data that occurred in the first data transfer operation.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

Hardware and Software Environment

Figure 2:
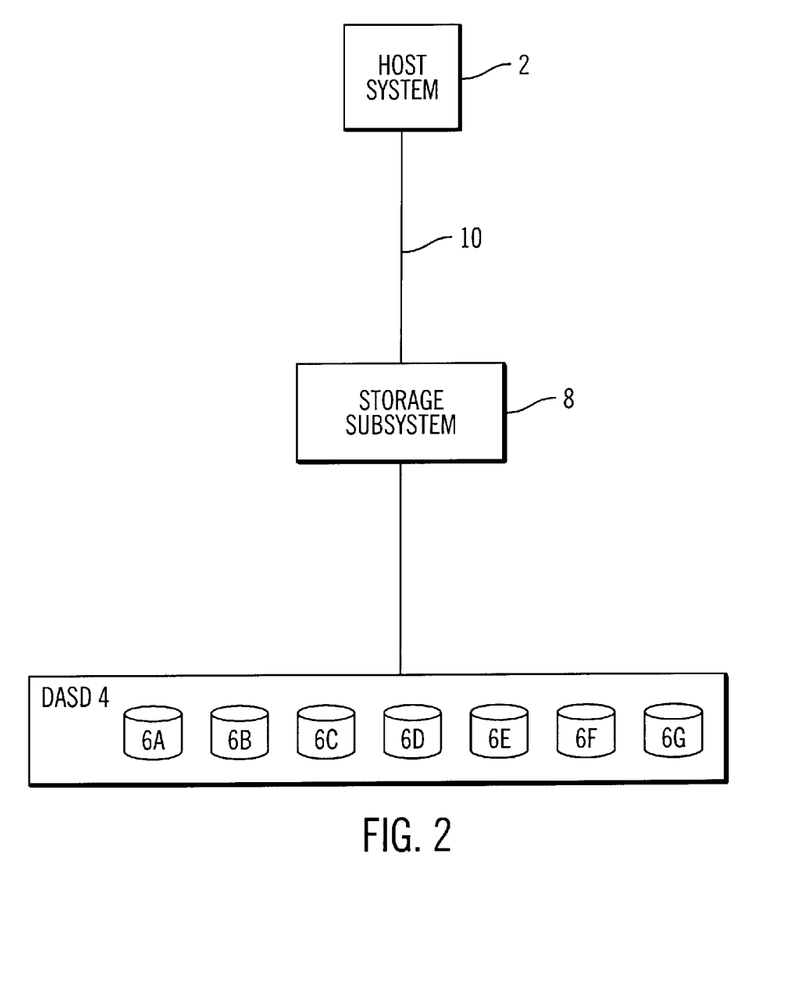
FIG. 2 is a block diagram illustrating a software and hardware environment in which preferred embodiments of the present invention are implemented.

FIG. 2 illustrates a preferred hardware and software environment in which preferred embodiments of the present invention are implemented. A host system 2 is in data communication with a direct access storage device (DASD) 4. In preferred embodiments, the host system 2 is a computer, e.g., mainframe, workstation, personal computer etc. In preferred embodiments, the host system 2 views a virtual arrangement of the data, such as functional volumes and tracks, which map to specific physical locations in the DASD 4. The DASD 4 is comprised of a plurality of non-volatile storage devices 6a–f, e.g., hard disk drives (HDDs), magnetic tape, optical disks, non-volatile RAM, holographic units, etc. The host system 2 communicates with the DASD 4 via a storage subsystem 8 which manages the DASD 4 and storage devices 6a–g. The host system 2 communicates with the storage subsystem 8 via a transmission line 10, using any suitable communication protocol known in the art, e.g., LAN, WAN, TCP/IP, the Internet, an Intranet, etc.

As discussed, in preferred embodiments, the host system 2 is configured to view a virtual arrangement of data that must be mapped to DASD 4 physical locations. In preferred embodiments, the storage subsystem 8 maps the address provided by the host system 2 to an actual storage device 6a–g and location therein. In further embodiments, the host system 2 may embody a virtual disk architecture, such as the virtual disk architecture of the IBM RAMAC Virtual Array, the Storage Tek Iceberg products, and IXFP. The IBM RAMAC virtual array system is described more fully in the IBM publication "IBM RAMAC Virtual Array," document no. SG24-4951-00 (IBM Copyright, 1997), which document is incorporated herein by reference in its entirety. The IBM virtual disk architecture further includes the Log Structured File (LSF) architecture. In LSF, new or updated data is placed at the end of the log or free area. Data is never updated in place; it is always written to a new place.

In preferred embodiments, the host system 2 views the data in the DASD 4 as functional volumes comprised of functional tracks. The DASD 4 are managed as arrays. Each array contains several array devices, wherein each array device is one storage device 6a–g. Each array device is comprised of array tracks. An array cylinder is a plurality of array tracks, and is the common unit of allocation in the system. The host system 2 maintains various tables and maps in memory to map the functional (virtual) volumes and tracks to physical locations in the DASD 4.

Data Structures For Moving Data

Figure 3A:
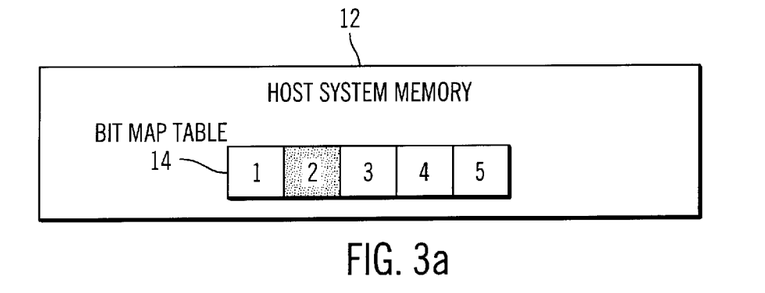
FIGS. 3A and 3B illustrate data movement operations in accordance with preferred embodiments of the present invention.

FIGS. 3A, B and 4A, B, C, D illustrate data structures the host system 2 maintains in a memory location 12 which the host system 2 processes to perform data movement operations that require at least two separate data movements, such as SnapShot or other address duplication programs that first copy and modify data in addition to copying the address information. FIG. 3A shows the memory 12 in the host system 2 storing a bit map table 14. The bit map table 14 is a data structure that has an addressable location corresponding to each functional track in the source volume. Each addressed location in the bit map table 14 maintains an "on" or "off" value, i.e., binary one or zero. An "off" (binary zero) value indicates that the functional track addresses a storage location including data transferred to another volume and an "on" (binary one) value indicates that the functional track addresses a storage location including data that has not yet been transferred and may be subject to future data movement operations. In FIG. 3A, the "off" location in the bit map table 14 is the shaded location representing source track 2.

Figure 3B:
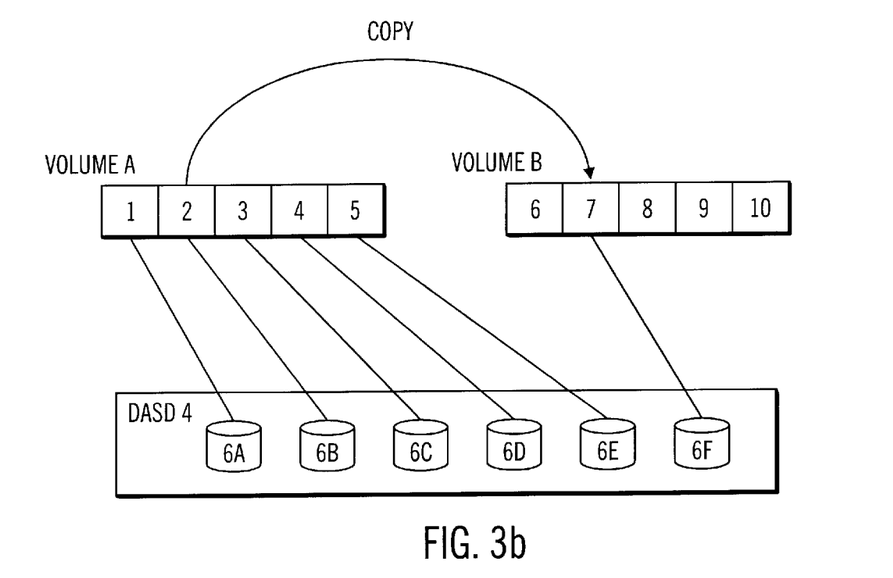

FIG. 3B illustrates the host system 2, executing an address duplication program, by initially copying data from functional track 2 in functional volume A to functional track 7 in functional volume B. In preferred embodiments, the host system 2 moves the data from the source location to a corresponding target location, which is the same as the source track plus an offset value that is the difference of the first specified target and source functional tracks. For instance, in the exemplar of FIG. 3B, the source tracks are 1–5 and the target tracks are 6–10, making the copy offset five. Thus, to determine the target track from the source, add the calculated offset.

The host system 2 may modify the data copied during the initial data movement operation. In preferred embodiments, the host system 2 would then generate the bit map table 14 after the first data movement transferring data from a source functional volume to a target functional volume. In further embodiments, the host system 2 may generate the bit map table 14 after performing any type or number of initial data movement operations, such as the copying of a data set, track, volume, VTOC or any other type or grouping of data.

After generating the bit map table 14, the host system 2 would then proceed to perform the second data movement component of the address duplication program, which in preferred embodiments involves copying the actual address information. The host system 2 would use the bit map table 14 to avoid copying the address information for the source functional tracks that address data that was copied to the target volume during the first data movement operation.

Figure 4A:
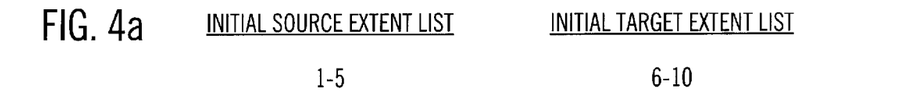
FIGS. 4A, 4B, 4C, and 4D illustrates data structure used in data movement operations in accordance with preferred embodiments of the present invention.
Figure 4B:
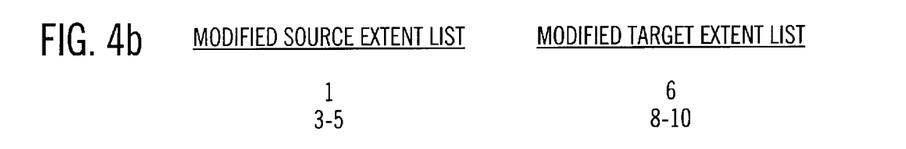
Figure 4C:
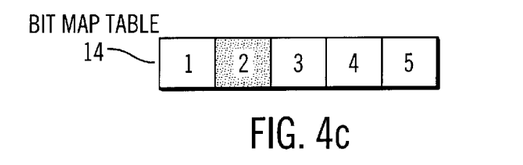

FIGS. 4A and B illustrate initial and modified source and target extent lists the host system 2 maintains in memory 12 when performing data movement operations. In preferred embodiments, the initial source and target extent lists are user specified source and target ranges of tracks in the data transfer, e.g., address duplication, operation. In alternative embodiments, the user may select the source of the copy, and the host system 2 may determine the target range or extent. The host system 2 then processes the bit map table 14 (shown in FIG. 4C) to generate the modified source and target extent lists, shown in FIGS. 4A and B, that are the addresses subject to the second data movement operation. The modified source extent list of tracks 1 and 3–5 are the functional tracks in volume A addressing physical locations storing data that was not moved during the initial data movement component of the address duplication operation. The modified target extent list of tracks 6 and 8–10 are the functional tracks in target volume B that do not address data transferred over during the initial data movement operation.

Figure 4D:
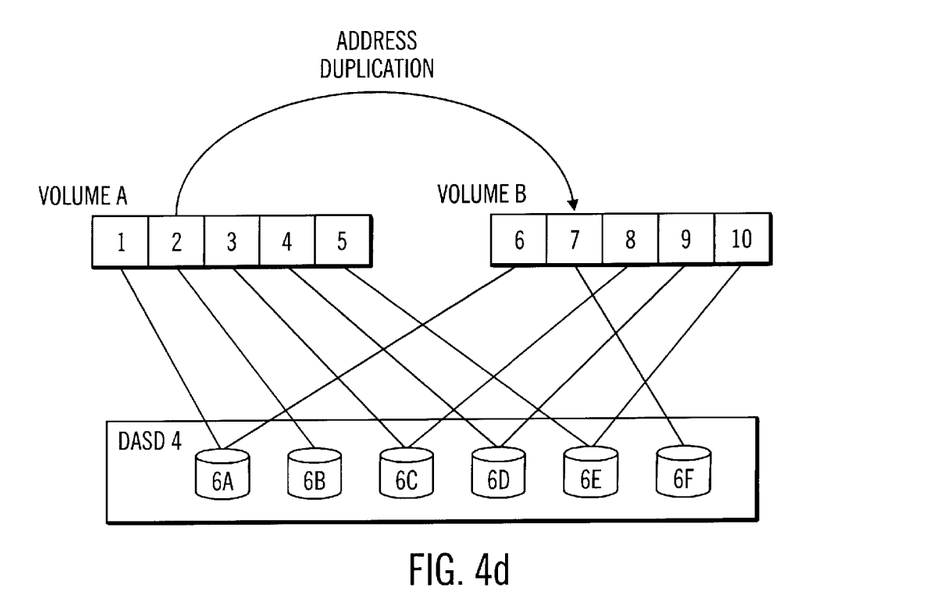

FIG. 4D illustrates the result of the second data movement operation involving the duplication of the address information utilizing the modified source and target extent lists. In accordance with preferred embodiments of the present invention, the host system 2 only copies over the functional track address information for those functional tracks listed in the modified source extent list to those functional tracks listed in the modified target extent list. For instance, target functional track 7 addresses storage location 6f that includes data transferred during the initial data movement operation illustrated in FIG. 3B. By using the modified extent lists during the second data movement in which address information is copied, the host system 2 will not modify the addressing for functional track 2 in volume B. Instead, the host system 2 will copy the functional track addressing from the first source functional track in the source extent list to the first target functional track in the target extent list. The addressing for the next source functional track listed in the source extent list will be copied over to the addressing of the next target functional track listed in the target functional track index. In this way, source and target functional tracks addressing storage locations involved in previous data movement components of the address duplication procedure will not be effected by the second data movement operation where address information is copied.

Thus, the preferred embodiments may be implemented as a method, apparatus or article of manufacture using standard programming and/or engineering techniques to produce software, firmware, hardware, or any combination thereof. The term "article of manufacture" (or alternatively, "computer program product") as used herein is intended to encompass one or more computer programs and data files accessible from one or more computer-readable devices, carriers, or media, such as a magnetic storage media, "floppy disk," CD-ROM, a file server providing access to the programs via a network transmission line, holographic unit, etc. Of course, those skilled in the art will recognize many modifications may be made to this configuration without departing from the scope of the present invention.

Logic for Using Bit Maps To Represent Target And Sources In Copy Operations

Figure 5:
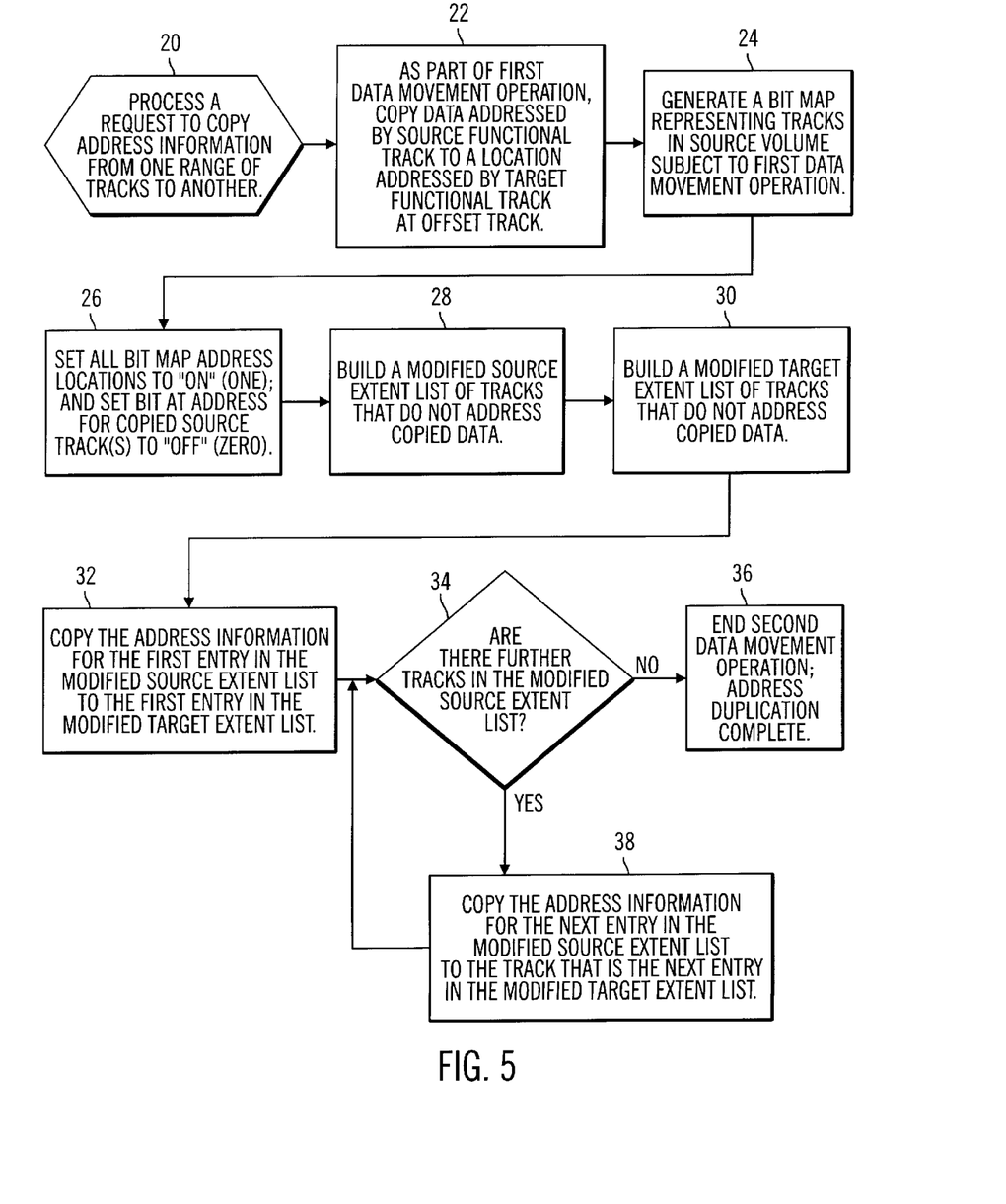
FIG. 5 is a flowchart showing logic to move data and generate data structures in accordance with preferred embodiments of the present invention.

FIG. 5 is a flowchart illustrating logic included in the hardware and software of the host system 2 to generate and use the bit map table 14 in accordance with preferred embodiments of the present invention. In preferred embodiments, the host system 2 is a multi-tasking system. In such case, the host system 2 may simultaneously execute multiple instances of the logic of FIG. 5. Once the host system 2 has completed executing an instance of the logic of FIG. 5, the host system 2 may continue executing other threads concurrently being executed and/or begin executing further threads. Those skilled in the art will recognize that this logic is provided for illustrative purposes only and that different logic may be used to accomplish the same results. Moreover, the logic order shown in FIG. 5 may be performed in an order other than shown in the figures.

Logic begins at block 20 which represents the host system 2 processing a request to duplicate address information, e.g., a SnapShot request, from one range of tracks, an initial source extent list, to an output range of tracks, an initial target extent list. In preferred embodiments, this address duplication involves two separate component data movement operations. Control transfers to block 22 which represents the host system 2, as part of the first data movement component, copying data addressed by a source functional track to a location addressed by a target functional track at an offset track value. The offset represents the difference, if any, between the first source track in the address duplication operation from the first target track. Thus, if data addressed by source track X is copied as part of the first data movement, then the copy of this data will be addressed by track (X+Offset) in the target location. As discussed, the data copied as part of the first data movement may be modified by the host system 2, such as the case when the VTOC is initially copied over.

Control transfers to block 24 which represents the host system 2 generating the bit map table 14 having addressable locations corresponding to tracks in the source volume. Control transfers to block 26 which represents the host system 2 setting each addressable location in the bit map table 14 to "on" (binary one) and setting the value in the bit map corresponding to the source track(s) copied during the first data movement to the target volume to "off" (binary zero). Control then transfers to block 28 which represents the host system 2 building a modified source extent list from the information in the bit map table 14 to include those tracks that do not address previously transferred data. The host system 2 will exclude those tracks whose value in the bit map table is "off" (binary zero), indicating that the data at the track was copied in the previous data movement operation.

Control transfers to block 30 representing the host system 2 building a modified target extent list listing those target tracks that address data transferred during the first data movement operation. The host system 2 would start at the first track in the target extent list and add the target tracks to the modified extent list. The host system 2 would exclude those target tracks corresponding to source tracks having an "off" value in the bit map table 14. When determining whether to include a target track, the host system 2 may subtract the offset value from the current target track X (X-Offset) and determine whether the bit map value for the addressable location for the source track at (X-Offset) is "off." However, those skilled in the art will appreciate that alternative methods for building the modified source and target extent lists based on the information in the bit map table 14 may be used.

Control then transfers to block 32 which represents the host system 2 copying the address information for the first entry in the modified source extent list to the first functional track entry in the modified target extent list. Thus, the first target functional track in the modified target extent list and the first source functional track in the modified source extent lists address the same DASD 4 location after the second data movement. Control transfers to block 34 which is a decision block representing the host system 2 determining whether there are further tracks in the modified extent lists not considered. If so, control transfers to block 36; otherwise, control transfers to block 38, which represents the end of the second data movement operation and the completion of the address duplication request. Block 38 represents the host system 2 copying the address information for the next track entry in the modified source extent list to the track that is the next entry in the modified target extent list. Control then transfers back to block 34 to copy further tracks in the modified extent lists, if any.

As a result of the second data movement involving the copying of the address information, the functional tracks in the target volume B that did not address DASD 4 locations maintaining data transferred in the previous copy operation, now address the same storage locations that the functional tracks in the source extent list address.

Conclusion

This concludes the description of the preferred embodiments of the invention. The following describes some alternative embodiments for accomplishing the present invention.

In preferred embodiments, the logic of FIG. 5 is implemented in software within the host system 2. However, in alternative embodiments certain steps of the logic of FIG. 5 may be implemented in a system external to the host system 2, such as the storage subsystem 8.

The above embodiments concern data transfer operations performed with respect to functional tracks and volumes. However, in alternative embodiments any data grouping could be involved in the data transfer operation. Moreover, the values in the bit map tables may indicate the status of storage units other than functional tracks, such as volumes, cylinders or any other type of data set or data grouping.

Preferred embodiments were described with respect to data duplication programs, such as the SnapShot copy program, that involve a first data movement operation where data, such as the VTOC, is copied, modified and transferred to a location addressed by the target. The second data movement operation involves the copying of the address information. However, those skilled in the art will appreciate that the preferred embodiments of the present invention may apply when any copy operation involving the copying of addressing information is used after data has been moved in an initial copy operation. Moreover, in yet further embodiments, the first copy operation may involve the movement of data and/or address information and the second copy operation may likewise involve the movement of data and/or address information. In fact, the bit map table of the present invention may be used in dual data movement operations whenever it is necessary to keep track of a first data movement operation to avoid, during a subsequent copy operation, copying over data transferred during the first data movement operation.

Preferred embodiments were described with respect to a bit map table that provides information on the data movement status of data. However, in alternative embodiments, data structures other than a bit map data structure may be used to indicate whether a particular addressed storage location was involved in a data movement operation.

In summary, preferred embodiments in accordance with the present invention disclose a system for transferring data. A first data transfer from at least one source storage location to at least one target storage location is processed. A data structure indicates the source storage locations from which data was transferred during processing of the first data transfer. A second data transfer from a plurality of source storage locations to a plurality of target storage locations is processed. The data structure is then processed to determine the source storage locations included in the second data transfer that were not involved in the first data transfer. Data is then transferred from the source storage locations that were not involved in the first data transfer to the target storage locations that did not receive data during the processing of the first data transfer.

The foregoing description of the preferred embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for transferring data, comprising:
    (a) processing a first data transfer specifying data to transfer from at least one source storage location to at least one target storage location;
    (b) indicating in a data structure the source storage locations from which data was transferred during processing of the first data transfer;
    (c) processing a second data transfer specifying data to transfer data from a plurality of source storage locations to a plurality of target storage locations;
    (d) processing the data structure to determine the source storage locations included in the second data transfer that were not involved in the first data transfer; and
    (e) of the source and target locations specified in the second data transfer, only transferring data from the source storage locations that were not involved in the first data transfer to target storage locations that did not receive data during the processing of the first data transfer as determined from the data structure.

2. The method of claim 1, further including the step of processing the data structure to determine the target storage locations that were not involved in the first data transfer by performing the steps of:
    determining an offset value of a difference between a source storage location and a corresponding target storage location;

determining a corresponding source storage location at a difference between the target storage location and the offset value; and determining whether the data structure indicates that the corresponding source storage location was involved in the first data transfer, wherein the target storage location was involved in the first data transfer when the corresponding source storage location was involved in the first data transfer.

3. The method of claim 1, wherein the first data transfer and second data transfer are components of a single data transfer operation.

4. The method of claim 1, wherein the source storage locations and the target storage locations are addresses that address physical storage locations.

5. The method of claim 4, wherein the step of transferring data from the source storage locations to the target storage locations during the first data transfer comprises the step of transferring data from the physical storage locations addressed by the source storage locations to the physical storage locations addressed by the target storage locations included in the first data transfer.

6. The method of claim 4, wherein the step of transferring data during the second data transfer comprises the step of transferring address information from the source storage locations to the target storage locations, wherein after the transferring of address information in the second data transfer, the target storage locations address the same physical storage locations that the source storage locations involved in the second data transfer address.

7. The method of claim 1, wherein the data structure is a bit map data structure, wherein addressable locations in the bit map correspond to source storage locations, wherein the step of indicating in the first data structure the source storage location involved in the first data transfer comprises setting a value for the bit map locations corresponding to the source storage locations involved in the first data transfer that indicates that the source storage location was involved in the first data transfer.

8. The method of claim 7, wherein the step of indicating in the first data structure the source storage locations from which data was transferred further comprises the step of setting a value for the bit map locations corresponding to the source storage locations that were not involved in the first data transfer that indicates that the source storage location was not involved in the first data transfer.

9. The method of claim 8, further comprising the steps of:
processing the bit map structure to generate a first extent list structure that indicates source storage locations having a corresponding value in the bit map structure equal to the value indicating that the source storage location was not involved in the first data transfer; and
processing the bit map structure to generate a second extent list structure that indicates target storage locations corresponding to source storage location having a corresponding value in the bit map structure equal to the value indicating that the source storage location was not involved in the first data transfer.

10. The method of claim 9, wherein data is transferred in the second data transfer by modifying the target storage locations indicated in the second extent list to address the storage locations addressed by the source storage locations indicated in the first extent list.

11. A computer system for transferring data, comprising:
(a) at least one storage device including a plurality of storage locations; and
(b) a computer system in communication with the storage devices, including a program and memory, wherein the program is capable of causing a processor to perform:

(i) processing a first data transfer specifying data to transfer from at least one source storage location to at least one target storage location;
(ii) indicating in a data structure stored in the memory the source storage locations from which data was transferred during processing of the first data transfer;
(iii) processing a second data transfer specifying data to transfer from a plurality of source storage locations to a plurality of target storage locations;
(iv) processing the data structure to determine the source storage locations included in the second data transfer that were not involved in the first data transfer; and
(v) of the source and target locations specified in the second data transfer, only transferring data from the source storage locations that were not involved in the first data transfer to the target storage locations that did not receive data during the processing of the first data transfer as determined from the data structure.

12. The computer system of claim 11, further including:
means for determining an offset value of a difference between a source storage location and a corresponding target storage location;
means for determining a corresponding source storage location at a difference between the target storage location and the offset value; and
means for determining whether the data structure indicates that the corresponding source storage location was involved in the first data transfer, wherein the target storage location was involved in the first data transfer when the corresponding source storage location was involved in the first data transfer.

13. The computer system of claim 11, wherein the source storage locations and the target storage locations are addresses that address physical storage locations.

14. The computer system of claim 13, further including means for transferring data from the physical storage locations addressed by the source storage locations to the physical storage locations addressed by the target storage locations included in the first data transfer.

15. The computer system of claim 13, further including means for transferring address information from the source storage locations to the target storage locations, wherein after the transferring of address information in the second data transfer, the target storage locations address the same physical storage locations that the source storage locations involved in the second data transfer address.

16. The computer system of claim 11, wherein the data structure is a bit map data structure, wherein addressable locations in the bit map correspond to source storage locations, wherein the program means further includes means for setting a value for the bit map locations corresponding to the source storage locations involved in the first data transfer that indicates that the source storage location was involved in the first data transfer.

17. The computer system of claim 16, wherein the program means further includes means for setting a value in the bit map locations corresponding to the source storage locations that were not involved in the first data transfer that indicates that the source storage location was not involved in the first data transfer.

18. The computer system of 17, wherein the program means further includes:
means for processing the bit map structure to generate a first extent list structure that indicates the source storage locations having the value in the bit map structure that indicates that the source storage location was not involved in the first data transfer; and means for processing the bit map structure to generate a second extent list structure that indicates the target storage locations corresponding to source storage location having a value in the bit map structure that indicates that the source storage location was not involved in the first data transfer.

19. The computer system of claim 18, wherein data is transferred in the second data transfer by modifying the target storage locations indicated in the second extent list to address the storage locations addressed by the source storage locations indicated in the first extent list.

20. An article of manufacture for use in programming a computer system to control a plurality of storage devices that store data, wherein the computer system is in data communication with the storage devices, the article of manufacture comprising at least one computer readable storage device including at least one computer program embedded therein that causes the computer system to perform:

(a) processing a first data transfer specifying data to transfer data from at least one source storage location to at least one target storage location;

(b) indicating in a data structure the source storage locations from which data was transferred during processing of the first data transfer;

(c) processing a second data transfer specifying data to transfer data from a plurality of source storage locations to a plurality of target storage locations;

(d) processing the data structure to determine the source storage locations included in the second data transfer that were not involved in the first data transfer; and (e) of the source and target locations specified in the second data transfer, only transferring data from the source storage locations that were not involved in the first data transfer to target storage locations that did not receive data during the processing of the first data transfer as determined from the data structure.

21. The article of manufacture of claim 20, further including the step of processing the data structure to determine the target storage locations that were not involved in the first data transfer by performing the steps of:

determining an offset value of a difference between a source storage location and a corresponding target storage location;

determining a corresponding source storage location at a difference between the target storage location and the offset value; and determining whether the data structure indicates that the corresponding source storage location was involved in the first data transfer, wherein the target storage location was involved in the first data transfer when the corresponding source storage location was involved in the first data transfer.

22. The article of manufacture of claim 20, wherein the first data transfer and second data transfer are components of a single data transfer operation.

23. The article of manufacture of claim 20, wherein the source storage locations and the target storage locations are addresses that address physical storage locations.

24. The article of manufacture of claim 23, wherein the step of transferring data from the source storage locations to the target storage locations during the first data transfer comprises the step of transferring data from the physical storage locations addressed by the source storage locations to the physical storage locations addressed by the target storage locations included in the first data transfer.

25. The article of manufacture of claim 23, wherein the step of transferring data during the second data transfer comprises the step of transferring address information from the source storage locations to the target storage locations, wherein after the transferring of address information in the second data transfer, the target storage locations address the same physical storage locations that the source storage locations involved in the second data transfer address.

26. The article of manufacture of claim 20, wherein the data structure is a bit map data structure, wherein addressable locations in the bit map correspond to source storage locations, wherein the step of indicating in the data structure the source storage location involved in the first data transfer comprises setting a value for the bit map locations corresponding to the source storage locations involved in the first data transfer that indicates that the source storage location was involved in the first data transfer.

27. The article of manufacture of claim 26, wherein the step of indicating in the first data structure the source storage locations from which data was transferred further comprises the step of setting a value in the bit map structure corresponding to the source storage locations that were not involved in the first data transfer that indicates that the source storage location was not involved in the first data transfer.

28. The article of manufacture of claim 27, further comprising the steps of:

processing the bit map structure to generate a first extent list structure that indicates source storage locations having a corresponding value in the bit map structure that indicates that the source storage location was not involved in the first data transfer; and processing the bit map structure to generate a second extent list structure that indicates target storage locations corresponding to source storage location having a corresponding value in the bit map structure that indicates that the source storage location was not involved in the first data transfer.

29. The article of manufacture of claim 28, wherein data is transferred in the second data transfer by modifying the target storage locations indicated in the second extent list to address the storage locations addressed by the source storage locations indicated in the first extent list.

30. A memory for storing data accessible by at least one program being executed on a computer system, wherein the computer system is capable of controlling a plurality of storage devices, and wherein a first and second data transfers specify source and target locations subject to data transfer, comprising:

(a) a first data structure stored in the memory including information indicating source storage locations from which data was transferred during processing of the first data transfer;

(b) a second data structure in the memory indicating source storage locations included in the second data transfer that were not involved in the first data transfer, wherein the first data structure is processed to generate the second data structure; and (c) a third data structure in the memory indicating target storage locations included in the second data transfer that did not receive data during the processing of the first data transfer, wherein the first data structure is processed to generate the third data structure, and wherein of the source and target storage locations specified in the second data transfer, data is only transferred from the source storage locations indicated in the second data structure to the target storage locations indicated in the third data structure.

31. The memory of claim 30, further storing an offset value of a difference between a source storage location and a corresponding target storage location, wherein the computer system determines a corresponding source storage location at a difference between the target storage location and the offset value and wherein the computer system determines whether the data structure indicates that the corresponding source storage location was involved in the first data transfer, wherein the target storage location was involved in the first data transfer when the corresponding source storage location was involved in the first data transfer.

32. The memory of claim 30, wherein the source storage locations and the target storage locations are addresses that address physical storage locations.

33. The memory of claim 32, wherein during the processing of the first data transfer, the data from the physical storage locations addressed by the source storage locations is transferred to the physical storage locations addressed by the target storage locations.

34. The memory of claim 32, wherein during the processing of the second data transfer, address information from the source storage locations is transferred to the target storage locations, wherein after the transferring of address information in the second data transfer, the target storage locations address the same physical storage locations that the source storage locations involved in the second data transfer address.

35. The memory of claim 30, wherein the first data structure is a bit map data structure, wherein addressable locations in the bit map correspond to source storage locations, wherein a value is set for the addressable locations in the bit map structure corresponding to the source storage locations involved in the first data transfer that indicates that the source storage location was involved in the first data transfer.

36. The memory of claim 35, wherein a value is set in the addressable locations in the bit map structure corresponding to the source storage locations that were not involved in the first data transfer that indicates that the source storage location was not involved in the first data transfer.

37. The memory of claim 36, wherein the second data structure indicates the source storage locations having a corresponding value in the bit map structure that indicates that the source storage location was not involved in the first data transfer and wherein the third data structure indicates the target storage locations corresponding to source storage locations having a corresponding value in the bit map structure that indicates that the source storage location was not involved in the first data transfer.

* * * * *